US009266241B2

(12) United States Patent
Trompeter (10) Patent No.: US 9,266,241 B2
(45) Date of Patent: Feb. 23, 2016

(54) ROBOTIC WORK OBJECT CELL CALIBRATION SYSTEM

(76) Inventor: Matthew E. Trompeter, Macomb, MI (US)

( * ) Notice: Subject to any disclaimer, the term of this patent is extended or adjusted under 35 U.S.C. 154(b) by 732 days.

(21) Appl. No.: 13/385,091

(22) Filed: Feb. 1, 2012

(65) Prior Publication Data

US 2012/0283874 A1 Nov. 8, 2012

Related U.S. Application Data

(60) Provisional application No. 61/465,080, filed on Mar. 14, 2011, provisional application No. 61/518,912, filed on May 13, 2011.

(51) Int. Cl.
B25J 9/16 (2006.01)
(52) U.S. Cl.
CPC ..... *B25J 9/1692* (2013.01); *G05B 2219/39033* (2013.01)
(58) Field of Classification Search
None
See application file for complete search history.

(56) References Cited

U.S. PATENT DOCUMENTS

| 4,753,569 | A | 6/1988 | Pryor |
| 5,910,719 | A | 6/1999 | Thorne |
| 6,044,308 | A | 3/2000 | Huissoon |
| 6,352,354 | B1 | 3/2002 | Boillot |
| 6,529,852 | B2 | 3/2003 | Knoll et al. |
| 7,359,817 | B2 * | 4/2008 | Ban et al. ............ 702/94 |
| 7,756,608 | B2 | 7/2010 | Brogardh |
| 7,945,349 | B2 | 5/2011 | Svensson et al. |
| 7,979,159 | B2 | 7/2011 | Fixell |
| 8,180,487 | B1 | 5/2012 | Vangal-Ramamurthy et al. |
| 8,485,017 | B1 * | 7/2013 | Trompeter ............ 73/1.79 |
| 2003/0159299 | A1 | 8/2003 | Goodrich |
| 2004/0267405 | A1 | 12/2004 | Ingenhoven et al. |
| 2007/0141963 | A1 | 6/2007 | Mortell et al. |
| 2008/0234863 | A1 | 9/2008 | Pagel et al. |
| 2009/0157226 | A1 * | 6/2009 | de Smet ............ 700/254 |
| 2009/0240372 | A1 | 9/2009 | Bordyn et al. |
| 2011/0129792 | A1 | 6/2011 | Berckmans et al. |
| 2012/0265341 | A1 * | 10/2012 | Trompeter ............ 700/254 |
| 2012/0283874 | A1 * | 11/2012 | Trompeter ............ 700/254 |
| 2013/0268226 | A1 | 10/2013 | Mortino |

FOREIGN PATENT DOCUMENTS

JP 2005059103 3/2005
JP 2008112294 5/2008

* cited by examiner

*Primary Examiner* — Robert R Raevis
(74) *Attorney, Agent, or Firm* — Gerald R. Black, Esq.

(57) ABSTRACT

The robotic work object cell calibration system includes a work object. The work object emits a pair of beam-projecting lasers acting as a crosshair, intersecting at a tool contact point (TCP). The work object emits four plane-projecting lasers are used to adjust the yaw, pitch, and roll of the robot tool relative to the tool contact point (TCP). The robotic work object cell calibration system provides a calibration system which is simpler, which involves a lower investment cost, which entails lower operating costs than the prior art, and can be used for different robot tools on a shop floor without having to perform a recalibration for each robot tool.

4 Claims, 13 Drawing Sheets

FIGURE 11A
ROBOT without WORK OBJECT
(PRIOR ART)

FIGURE 11B
ROBOT with WORK OBJECT

FIGURE 11C
ROBOT with WORK OBJECT

ROBOTIC WORK OBJECT CELL CALIBRATION SYSTEM

This application is related to and claims priority to U.S. Provisional Application No. 61/465,080, Entitled "Robotic Work Object Cell Calibration System and Method," filed on Mar. 14, 2011, and to U.S. Provisional Application No. 61/518,912, Entitled "Robotic Work Object Cell Calibration System and Method," filed on May 13, 2011.

FIELD OF USE

The present invention relates to a calibration device and system for an industrial robot and, more particularly, to a calibration system for the industrial robot provided with an imaging device of a visual sensor for detecting a working tool and a working position.

BACKGROUND OF THE INVENTION

The sales of industrial robots that has been driven by the automotive industry, is now moving into tasks as diverse as cleaning sewers, detecting bombs, and performing intricate surgery. The number of units sold increased to 120,000 units in 2010, twice the number as the previous year, with automotive, metal and electronics industries driving the growth.

Prior approaches to calibrating robots use measuring devices that measure either the inaccuracies of the robot after the robot is built or devices which measure work piece positions relative to the robot position prior to off-line programs. Prior art systems involve expensive equipment and specialized users and take longer.

- U.S. Patent Application Disclosure No. 20090157226 (de Smet) discloses a robot-cell calibration system for a robot and it's peripheral. The system includes an emitter attached to the robot or its' peripheral and emits a laser beam and a receiver also mounted to the robot or its peripheral at a point to permit calibration and for receiving the laser beam and to permit calculations to determine the dimension between the emitter and the receiver.
- U.S. Pat. No. 6,408,252 (de Smet) discloses a calibration system and displacement measurement device for calibrating a robot system. The system comprising a linear displacement measurement device in conjunction with a robot calibration system. The linear displacement measurement device comprising an elongated member, a drum, a shaft, a drum displacement mechanism and a drum rotation sensor. The drum is displaced axially upon the shaft as the drum rotates when the elongated member is moved. The drum rotation sensor provides accurate information regarding the distance the elongated member travels. The displacement measuring device is used in an iterative manner with the calibration system for the purpose of the calibration of a robotic device.
- U.S. Pat. No. 6,321,137 (de Smet) discloses a method for calibration of a robot inspection system. The system is used for inspecting a work piece to maintain the accuracy of the robot during inspection of work pieces on a production basis. The system includes means for storing a mathematical model of the robot, means for measuring the position of a target, and then calibrating the robot based upon input from the mathematical model and the position of the target.
- U.S. Pat. No. 6,044,308 (Huissoon) discloses a method for calibration of pose of a tool contact point (TCP) of a robot controlled tool with respect to a toot sensor means in which the robot controlled tool is attached at an endpoint of the robot. A TCP sensor is located in a preselected second pose with respect to the reference fixture for sensing position of the tool contact point. The method includes positioning the tool sensor so that the reference fixture is in a field of view of the tool sensor and calculating a pose of the robot end point with respect to the robot frame of reference, calculating a pose of the reference fixture with respect to the tool sensor means from a sensed position of the four topographically defined features of the reference fixture, and calculating a position of the tool contact point with respect to the reference fixture from a sensed position of the tool contact point with respect to the TCP sensor means.

The primary object of the robotic work object and cell calibration system of the present invention is to increase the accuracy of the off-line program and decrease robot teaching time.

Yet another object of the robotic work object and cell calibration system of the present invention is to introduce an improved calibration device for use with robotic systems.

Still another object of the robotic work object and cell calibration system of the present invention is to provide a calibration system that is simpler, which results in improved precision, which involves a lower investment cost, and which entails lower operating costs than the prior art.

What is needed is a robotic work object cell calibration system for using different robot tools on a shop floor without having to perform a recalibration for each tool. What is needed is a robotic work object cell calibration system that requires no additional computers or software to determine the accuracy of the robot tool or location of peripheral equipment, which uses existing body-in-white procedures, personnel computers and software and ways of communicating information amongst the trades, and requires little or no retraining to deploy.

SUMMARY OF THE INVENTION

The robotic work object and cell calibration system of the present invention addresses these objectives and these needs.

In the first preferred embodiment of the present invention, the robotic work object cell calibration system includes a work object. The work object emits a pair of beam-projecting lasers from an E-shaped extension extending from a central frame. The beam-projecting lasers serve as a crosshair, intersecting at a tool contact point (TCP). The work object includes a horizontal frame member that includes a pair of opposing frame ends, and a vertical frame member that includes a pair of opposing frame ends. A plane-projecting laser is preferably disposed at each frame end, respectively, and a projected laser plane is emitted from each of the plane-projecting lasers, respectively. The plane-projecting lasers are used to adjust the yaw, pitch, and roll of the robot tool relative to the tool contact point (TCP).

A second preferred embodiment of the work object of the present invention comprises only two plane-projecting lasers being attached to the frame ends.

A third preferred embodiment of the work object of the present invention comprises of only one plane-projecting laser attached to the middle of the work object in whereby the laser head is capable of 360 degrees of rotation, allowing the robot tool to align first on x-axis, then on the z-axis after the laser head has been rotated.

For a complete understanding of the robotic work object and cell calibration system of the present invention, reference is made to the following summary of the invention detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE PREFERRED EMBODIMENTS

Figure 1:
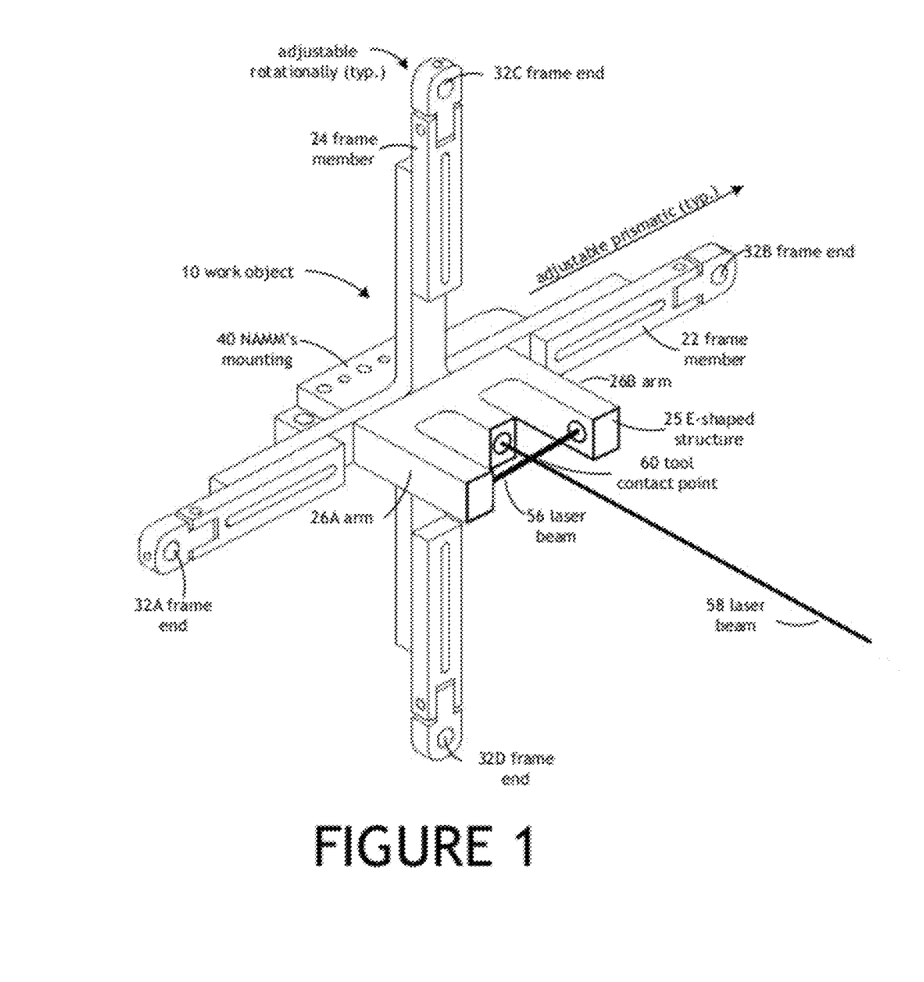
FIG. 1 depicts the first preferred embodiment of the work object of the present invention, and the two beam-projecting lasers are used for aligning the tool contact point with the work object.
Figure 2:
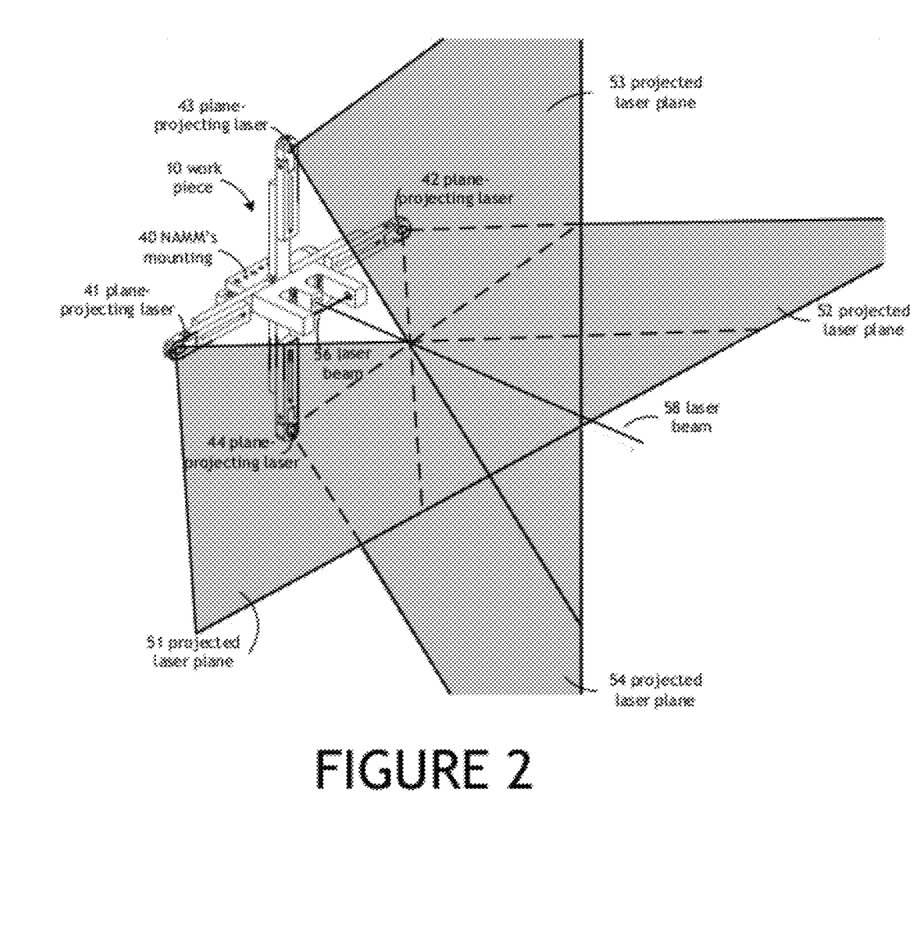
FIG. 2 depicts the first preferred embodiment of the work object of FIG. 1, the four plane-projecting lasers emitted from the work object.

Referring now to the drawings, FIGS. 1 and 2 disclose a first preferred embodiment of the work object [10] of the present invention. The work object [10] is used to calibrate the work path of a robot tool based on a tool contact point (point in space) [60]. The known point in space [60] is defined in three dimensions (X, Y, and Z) and relative to their rotational axes $R_x$ (pitch), $R_y$ (yaw), and $R_z$ (roll).

The work object [10] includes a horizontal frame member [22] that includes a pair of opposing frame ends [32A and 32B], and a vertical frame member [24] that includes a pair of opposing frame ends [32C and 32D]. A plane-projecting laser [41, 42, 43, and 44] is preferably disposed at each frame end [32A, 32B, 32C, and 32D], respectively, and a projected laser plane [51, 52, 53, and 54] is emitted from each of the plane-projecting lasers [41, 42, 43, and 44], respectively.

Extending along the horizontal frame member [22] are three arms parallel which combine to form the general shape of the letter "E" of an E-shaped structure [25] which is horizontally aligned and generally centrally disposed relative to frame member [22]. The center arm (not numbered) is shorter than the two end arms [26A and 26B].

A first beam-projecting laser [58] is emitted from the center arm of the "E" disposed at the proximate center of the work object [10]. A second beam-projecting laser [56] is emitted from one of the arms [26A] of an E-shaped structure [25] and is directed into the opposing arm [26B].

The first beam-projecting laser [58] intersects and is preferably perpendicular and coplanar with the second beam-projecting laser [56] at a known point in space [60], defined in three dimensions in terms of X, Y, and Z coordinates.

The first beam-projecting laser [58] is essentially coplanar with the two projected laser planes [51 and 52] emitted from the plane-projecting lasers [41 and 42] emitted from frame ends [32A and 32B]. Also, the first beam-projecting laser [58] is essentially coplanar with the two projected laser planes [53 and 54] emitted from the plane-projecting lasers [43 and 44] emitted from frame ends [32C and 32D]. The work object [10] is mountable onto a fixture [90] and enables a robot work path to be calibrated relative to the known point in space [60].

The plane-projecting lasers [41, 42, 43, and 44] are focusable lines that project the four projected laser planes [51, 52, 53, and 54] from the frame ends [32A, 32B, 32C, and 32D] of the work object [10]. The plane-projecting lasers [41, 42, 43, and 44] are red laser modules, having focused lines (3.5 v~4.5 v 16 mm 5 mw).

The beam projecting lasers [56 and 58] are focusable points that project the two laser beams emitted from the arm [26A] of the work object [10]. The beam projecting lasers [56 and 58] are red laser modules, having focusable dots (3.5 v~4.5 v 16 mm 5 mw).

Figure 3:
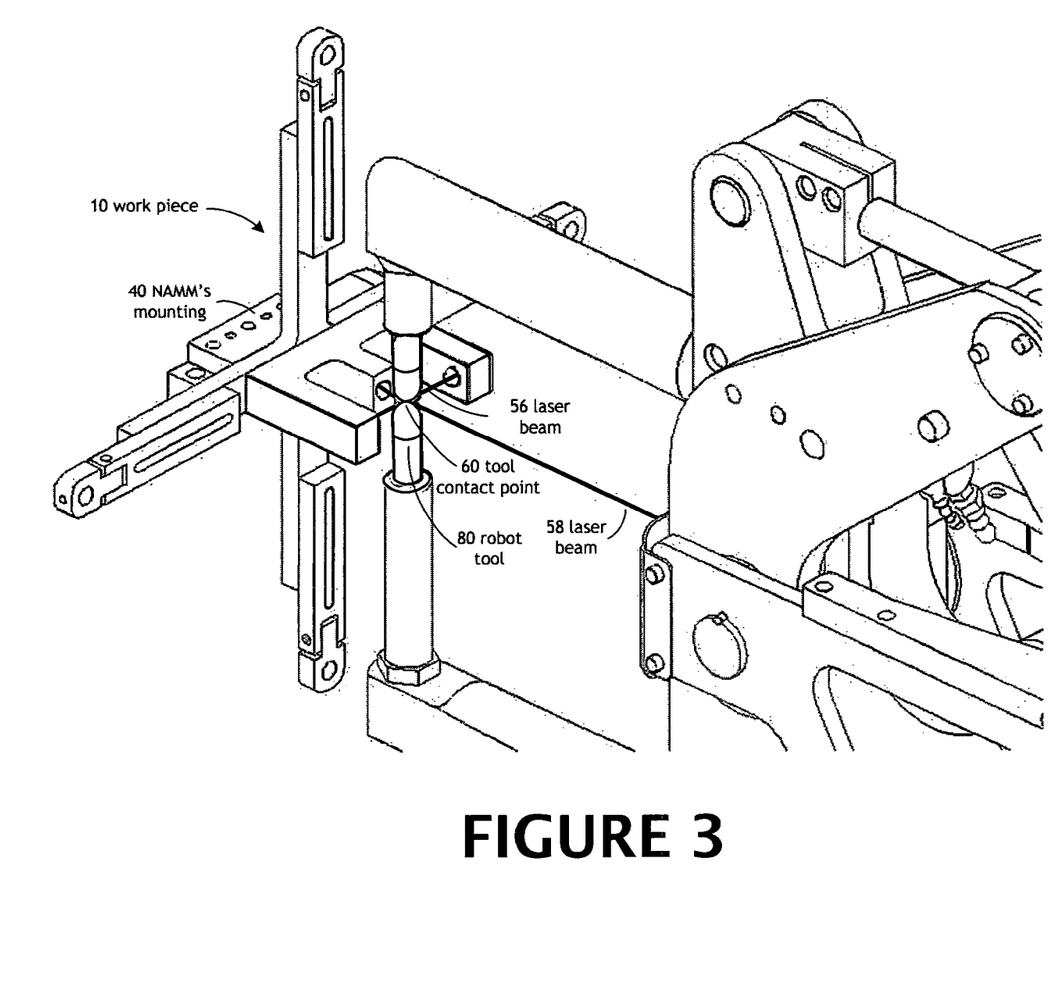
FIG. 3 depicts an exploded view of the first preferred embodiment of the work object of FIG. 1, further depicting the weld gun with the tool contact point of the weld gun aligned to the horizontal and vertical alignment lasers.

FIG. 3 discloses an exploded view of the work object [10] depicting a weld gun with the tool contact point [60] of the weld gun aligned to the two beam-projecting alignment lasers [56 and 58].

Figure 4:
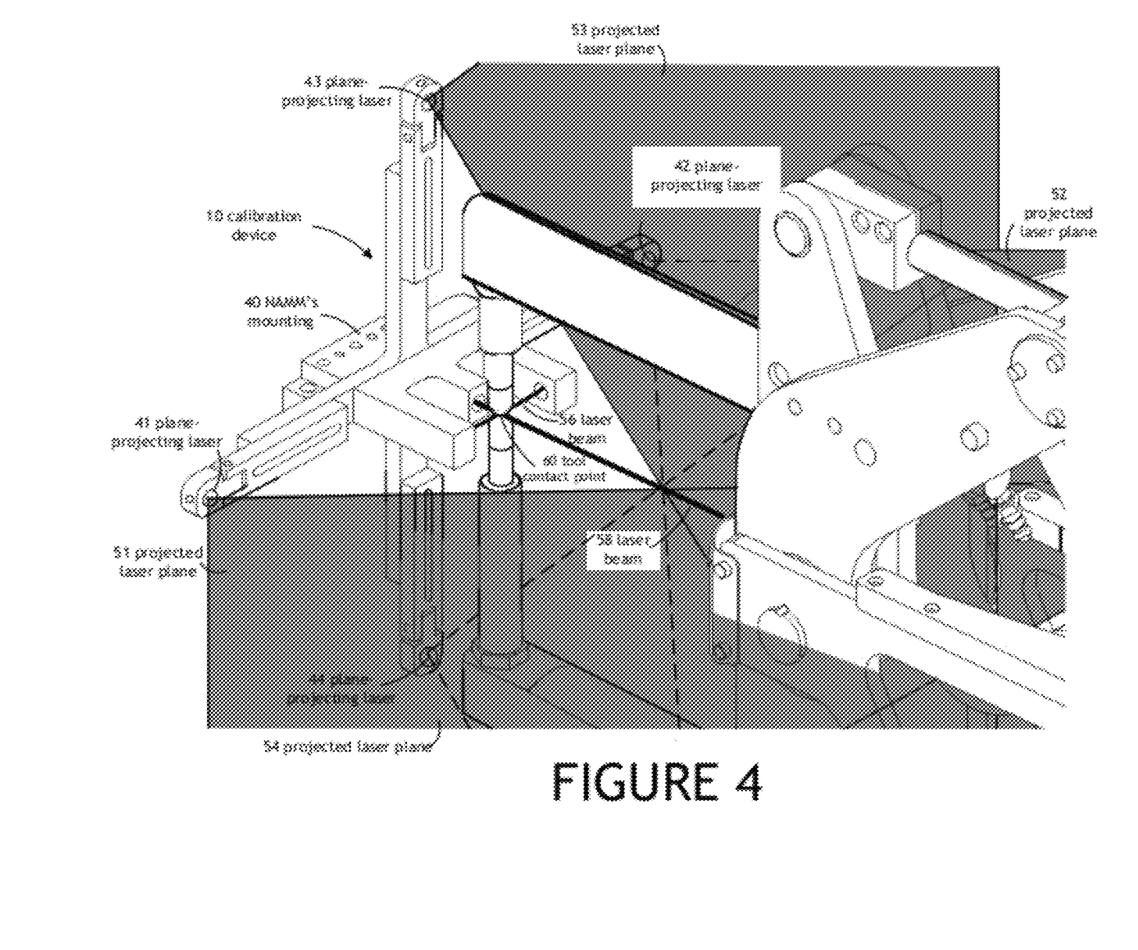
FIG. 4 depicts the exploded view of the first preferred embodiment of the work object of FIG. 3, further depicting the addition of two pairs of plane-projecting lasers for adjusting the yaw, pitch, and roll of the tool head of the weld gun.

FIG. 4 further depicts the addition of the four projected laser planes [51, 52, 53, and 54] from the plane-projecting lasers [41, 42, 43, and 44] for adjusting the yaw, pitch, and roll of the tool head of the robot.

Figure 5:
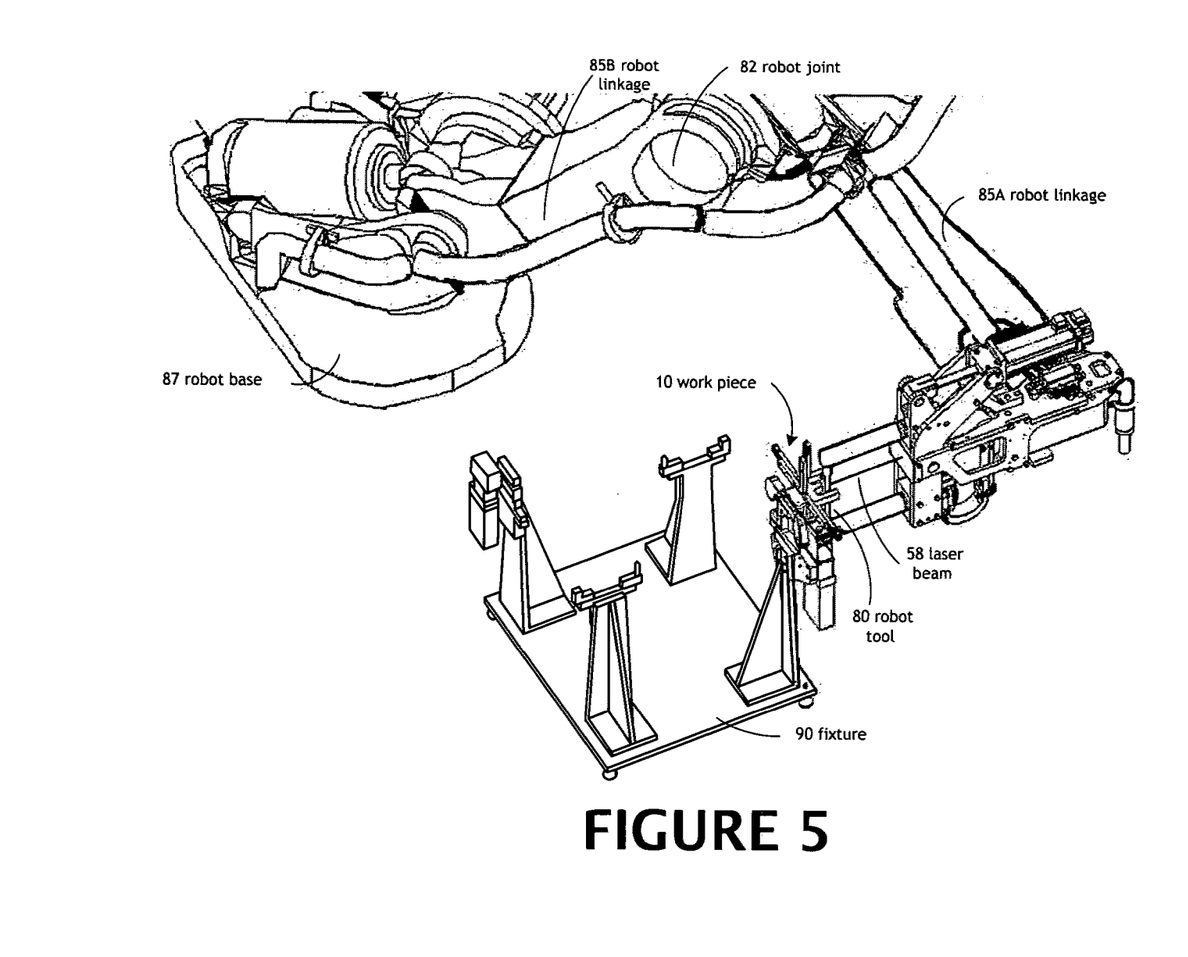
FIG. 5 depicts an assembly view of the first preferred embodiment of the work object of FIG. 1, further depicting the work object being mounted onto a fixture with the robot tool head aligned to the two beam-projecting lasers using the tool contact point.

FIG. 5 further depicts the work object [10] being mounted onto the fixture with the robot tool head aligned to the two beam-projecting lasers using the tool contact point.

Figure 6:
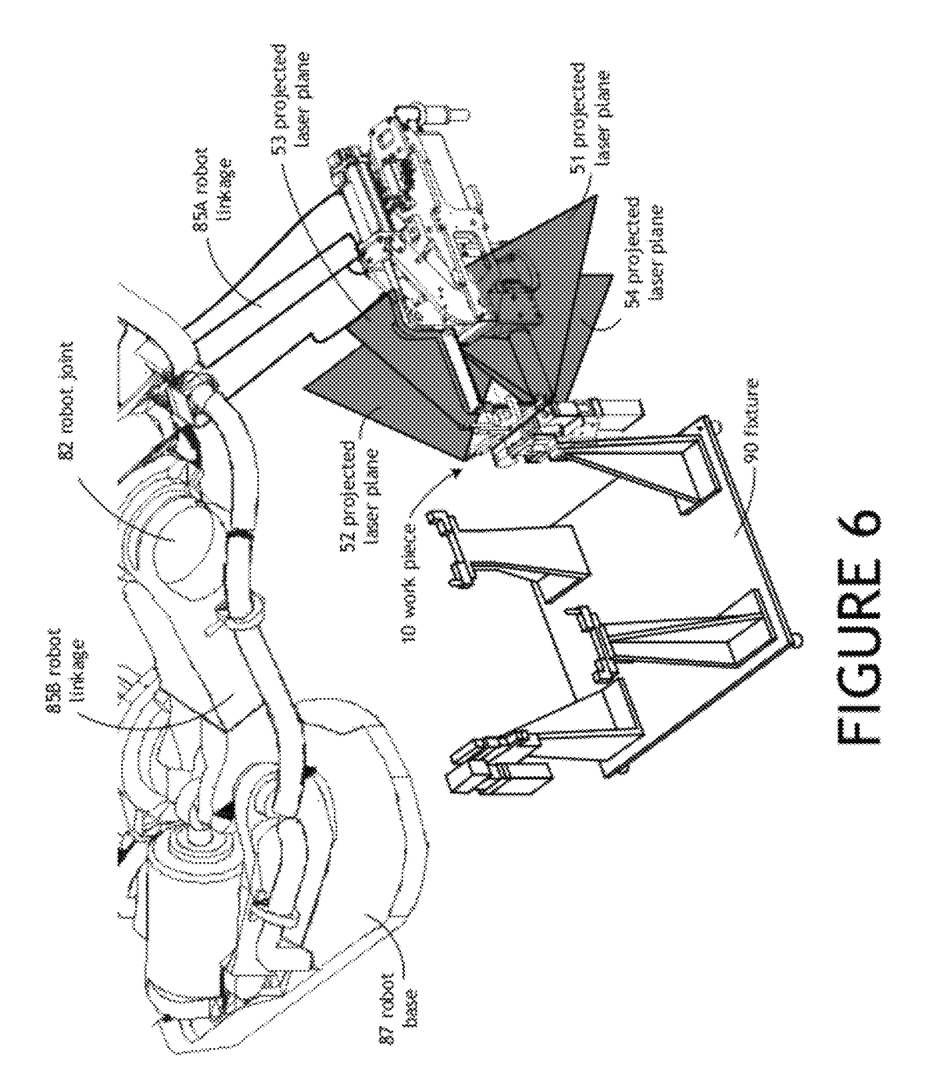
FIG. 6 depicts the assembly view of the first preferred embodiment of the work object of FIG. 5, further depicting the four plane-projecting lasers being used for adjusting the yaw, pitch, and roll of the tool head of the robot.

FIG. 6 further depicts the four projected laser planes [51, 52, 53, and 54] from the plane-projecting lasers of work piece [10], which are used to adjust the yaw, pitch, and roll of the tool head of the robot [80].

Figure 7:
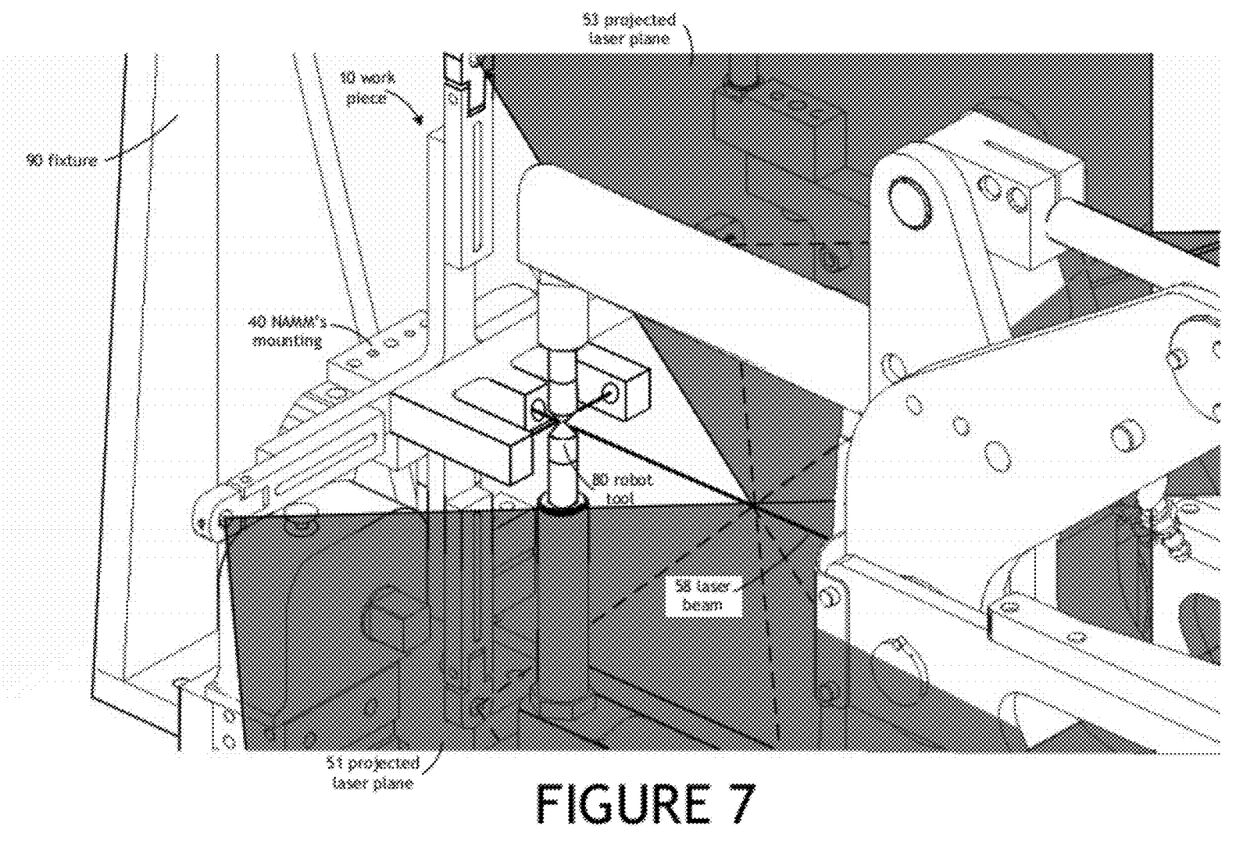
FIG. 7 depicts another exploded view of the first preferred embodiment of the work object of FIG. 6, further depicting the work object being mounted to the fixture with the robot tool aligned to the tool contact point alignment lasers and the yaw, pitch, and roll alignment lasers.

FIG. 7 further depicts the work object [10] being mounted to the fixture [90] with the robot tool [80] aligned to the tool contact point [60] alignment laser beams [56 & 58] setting the X, Y, and Z coordinates.

Figure 8:
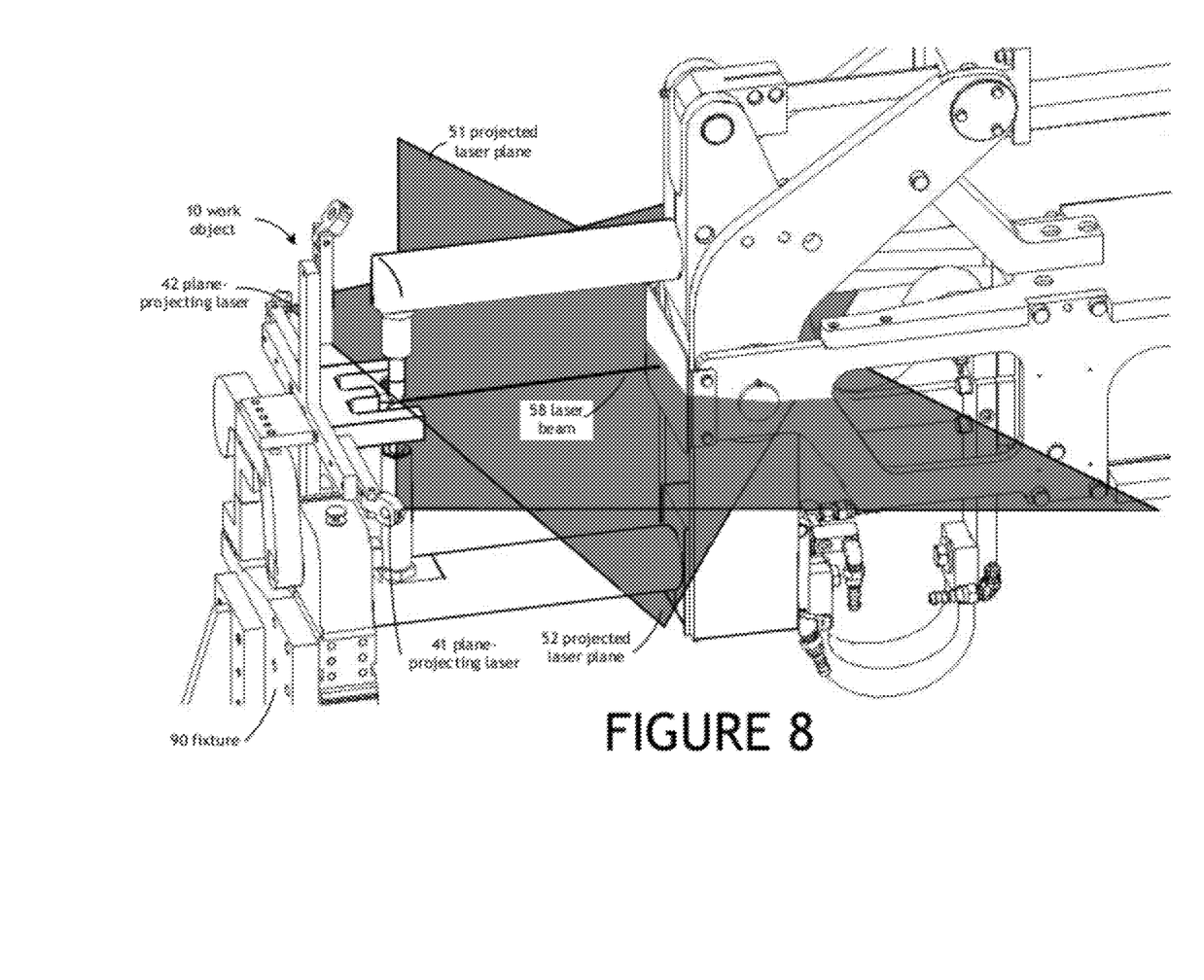
FIG. 8 depicts an assembly view of the second preferred embodiment of the work object of the present invention, two plane-projecting lasers being emitted along the horizontal axis of the work object, a pair of beam-projecting lasers intersecting at a tool contact point, the robot tool being aligned to the tool contact point and to this pair of plane-projecting lasers.

FIG. 8 depicts a second preferred embodiment of the work object [110] of the present invention. In this embodiment, two projected laser planes [51 and 52] are emitted from two plane-projecting lasers [41 and 42] are emitted along the horizontal axis of the frame of the work object [110]. The robot tool [80] is aligned to the tool contact point [60] and to this pair of projected laser planes [51 and 52].

Figure 9:
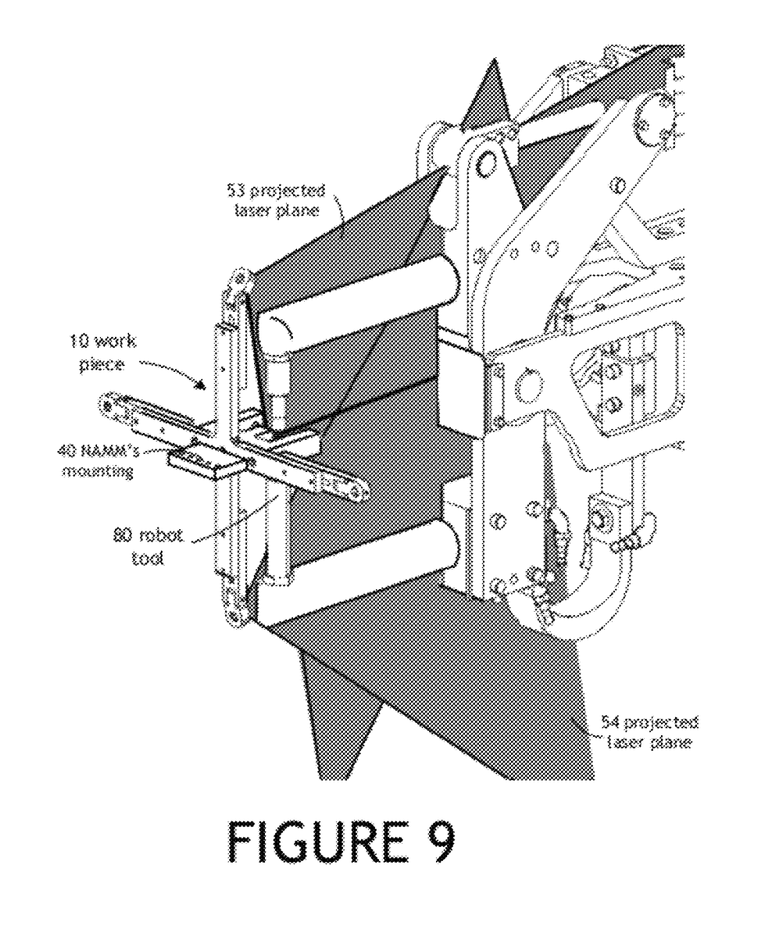
FIG. 9 depicts an assembly view of the third preferred embodiment of the work object of the present invention, two plane-projecting lasers being emitted along the vertical axis of the work object, a pair of beam-projecting lasers intersecting at a tool contact point, the robot tool being aligned to the tool contact point and to this pair of plane-projecting lasers.

FIG. 9 depicts a third preferred embodiment of the work object [210] of the present invention. In this embodiment, two projected laser planes [53 and 54] are emitted from two plane-projecting lasers [43 and 44] are emitted along the vertical axis of the frame of the work object [110]. The robot tool [80] is aligned to the tool contact point [60] and to this pair of projected laser planes [53 and 54].

Figure 10:
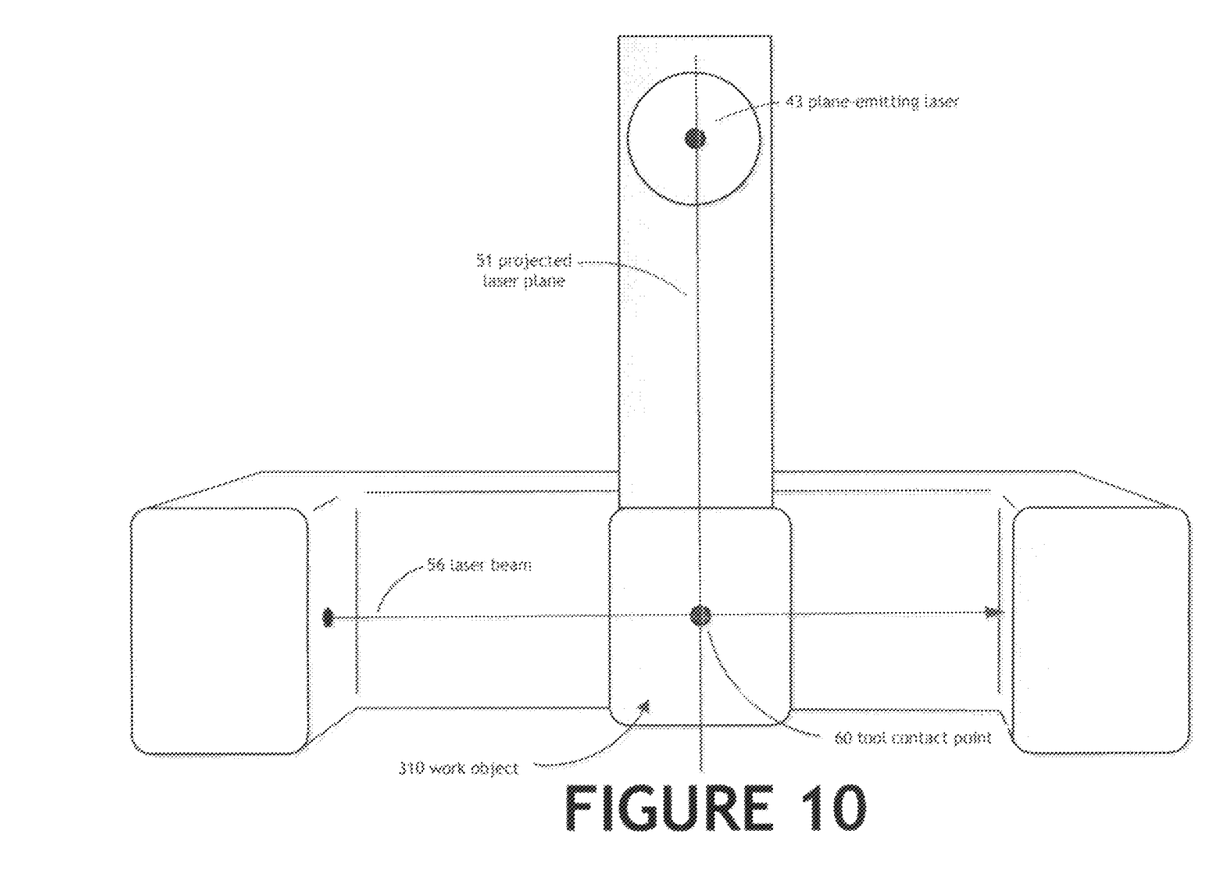
FIG. 10 depicts a fourth preferred embodiment of the work object of the present invention, two plane-projecting lasers being emitted along the vertical axis of the work object, and a beam-projecting laser intersecting one of the vertical plane-projecting lasers at a tool contact point.

FIG. 10 depicts yet another preferred embodiment of the work object [310] of the present invention. In this embodiment, two projected laser planes [53 and 54] are emitted from two plane-projecting lasers [43 and 44] along the vertical axis of the work object [10], and a beam-projecting laser [56] intersects one of the vertical plane-projecting lasers [53 and 54] at a tool contact point [60].

Figure 11A:
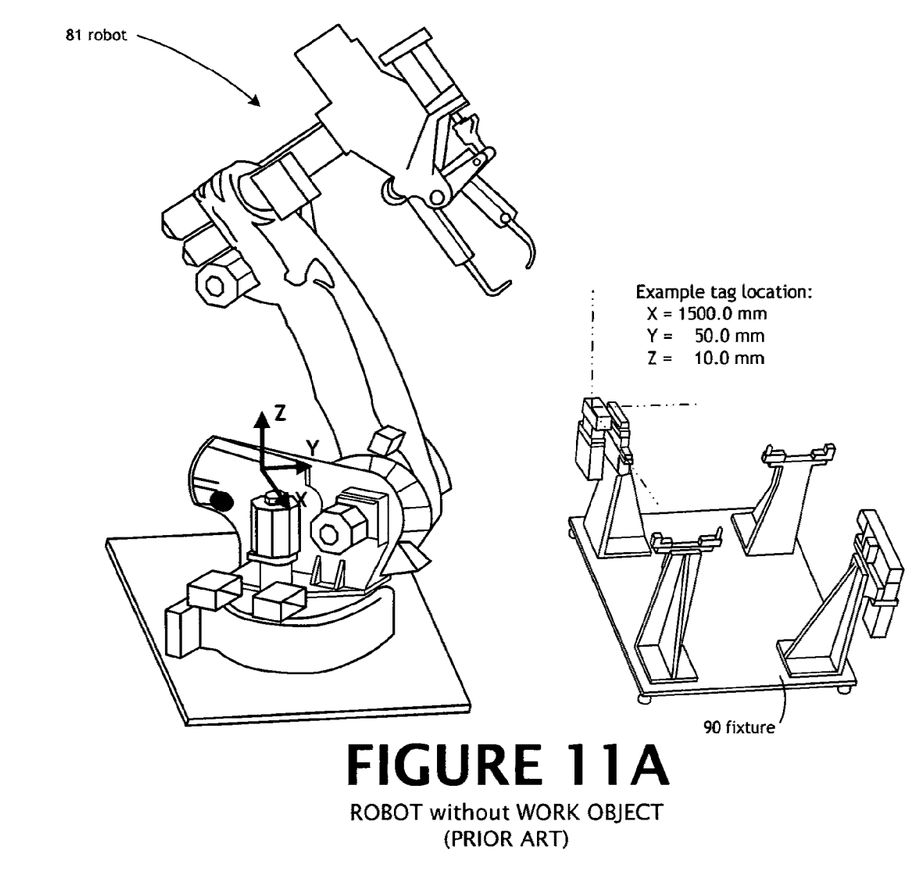
FIG. 11A depicts a robot and a fixture for use on a shop floor in a prior art embodiment without the work object of the present invention.

FIG. 11A depicts a robot and a fixture [90] for use on a shop floor in a prior art embodiment without the work object of the present invention. Without using the work object [10] of the present invention, the locations of the robot tags are relative to the robot base [81]. There is no known distance between the robot "zero" location and the fixture [90]. The tag location is relative to "zero" location on the robot base. An example of the tag location on the fixture 90 is X=1500.0 mm, Y=50.0 mm, and Z=10.0 mm.

Figure 11B:
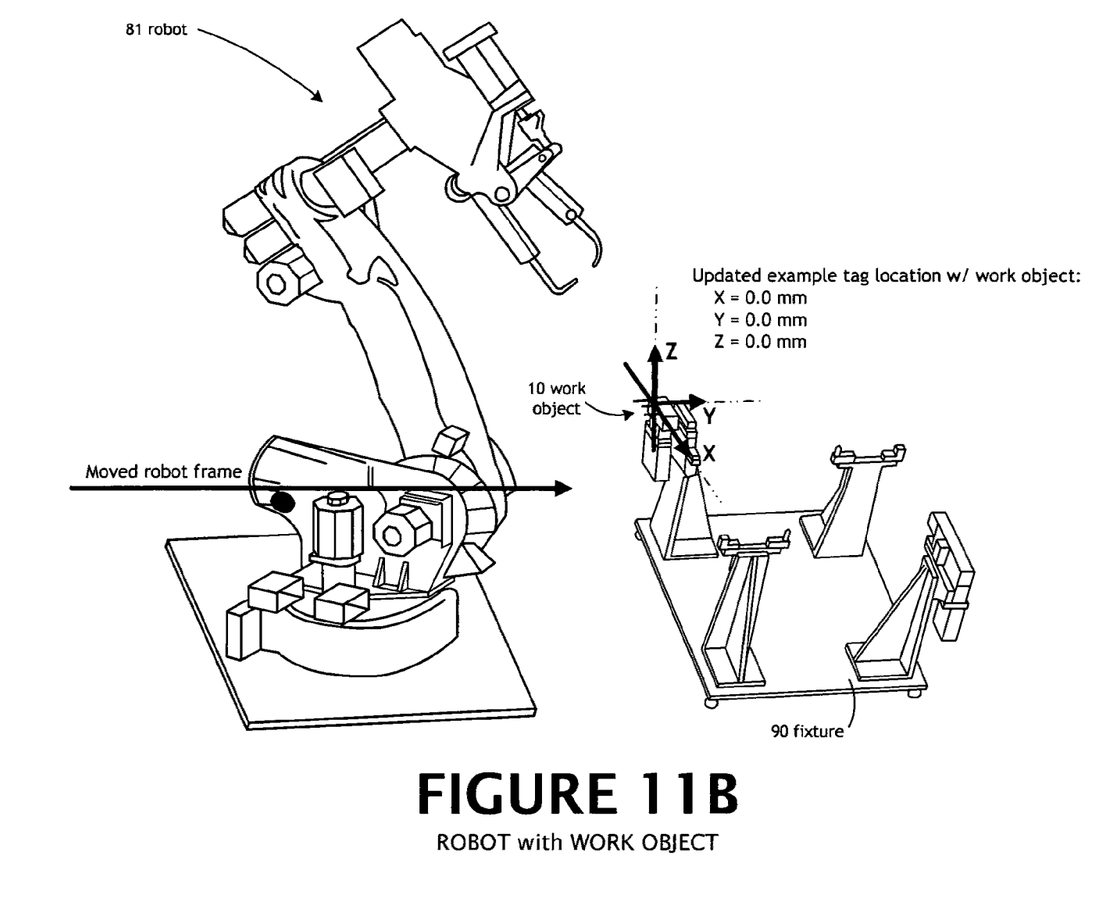
FIGS. 11B and 11C depict a similar robot, fixture with the work object of the present invention, showing how in a simplified manner the work object is used to obtain a new zero location and calibrate the path between the fixture and the robot.

FIG. 11B depicts a robot, and fixture [90] with the work object [10] of the present invention, showing how in a simplified manner the work object [10] is used to obtain a new zero location and calibrate the path between the fixture [90] and the robot. When using the work object [10] of the present invention, the locations of the robot tags are relative to the work object [10] which is now mounted on the fixture [90]. Here, the location of the robot path tags in this example are X=0.0 mm, Y=0.0 mm, and Z=0.0 mm.

Figure 11C:
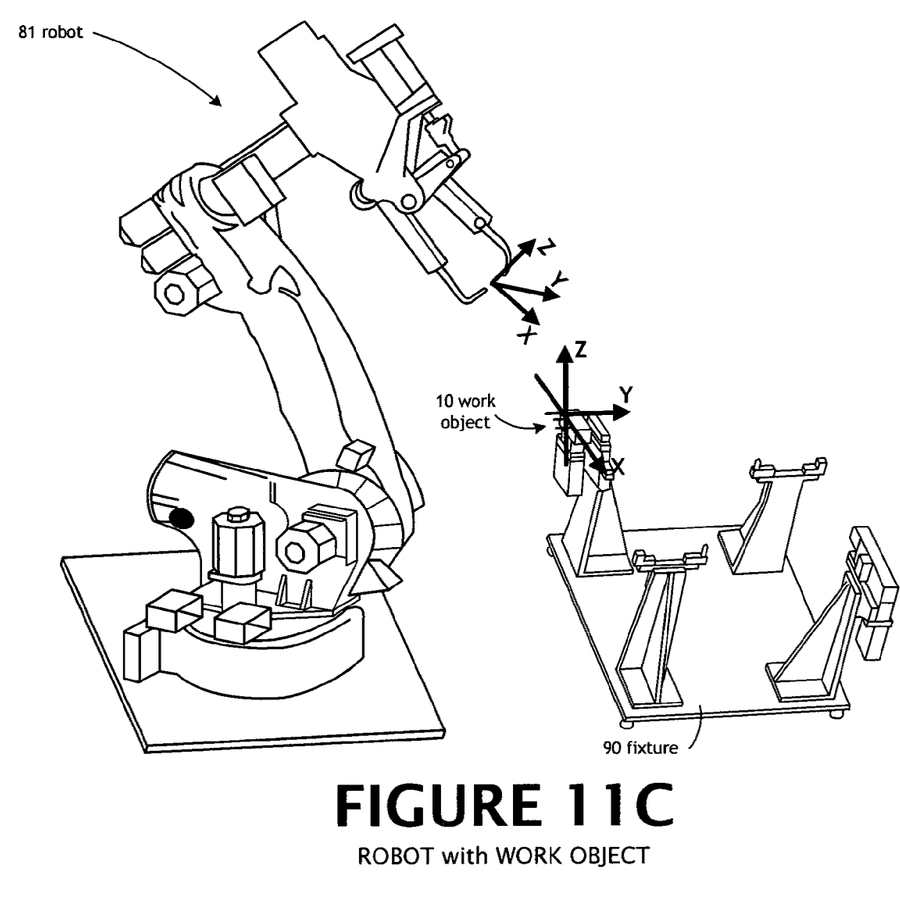

FIG. 11C again depicts the robot, and fixture [90] with the work object [10] of the present invention, showing how in a simplified manner the work object [10] is used to obtain a new zero location and calibrate the path between the fixture [90] and the robot. When the weld gun tips are placed with the work object [10] of the present invention, the robot will obtain the new zero location and calibrate the path to this location between the fixture [90] and the robot.

Using CAD simulation software, the CAD user selects a position on the tool to place the robotic work object calibration system that is best suited to avoid crashes with other tooling and for ease of access for the robot or end-of-arm tooling. The offline programs are then downloaded relative to this work object [10]. This work object [10] will be placed onto the tool or work piece in the position that was defined by the CAD user onto the shop floor. The robot technician will then manipulate the tool contact point (TCP) of the robot tool [80] into the device and align it to the beam-projecting lasers [56 and 58] to obtain the difference between the CAD world and shop floor. This difference will be entered into the robot tool [80] and used to define the new work object [10] thus calibrating the offline programs and defining the distance and orientation of the tool, fixture, and peripheral.

The offline programming with work object of the present invention [10] on the fixture [90] enable the work object [10] to be touched up to the "real world position" of the fixture [90] relative to the robot. If the fixture [90] ever needs to be moved or is accidently bumped, simply touch up the work object of the present invention [10] and the entire path shifts to accommodate.

The robotic work cell calibrations system of the present invention is compatible with any robotic simulation package including but not limited to ROBCAD, Process Simulate, DELMIA, Roboguide and RobotStudio CAD softwares.

The beam-projecting lasers [56 and 58] and the projected laser planes [51, 52, 53, and 54] are projected onto known features of the robot tool [80], and then used to calibrate the path of the robot tool [80] and measure the relationship of the fixture [90] to the robot tool [80].

The work object [10] of the present invention preferably mounts onto a fixture [90] using a standard NAMM's hole pattern mount [40].

The robotic work object cell calibration system of the present invention uses a work object [10] has a zero point, a zero reference frame, and a zero theoretical frame in space, which is positioned on the fixture [90].

The work object [10] is placed onto the fixture [90] which visually represents the work object [10] allowing the tool contact point (TCP) of the weld gun to be orientated into the work object [10] obtaining the "real-world" relationship of the robot tool [80] to the fixture [90] while updating the work object [10] to this "real-world" position.

The robotic work object cell calibration system of the present invention requires the position of the work object [10] correlating with the position of the robot tool [80] to calibrate the path of the robot tool [80] while acquiring the "real-world" distance and orientation of the fixture [90] relative to the robot tool [80].

The robotic work object cell calibration system of the present invention positions the robot tool [80] into the work object [10] and obtains the difference.

The laser plane generating system deployed in the robotic work object cell calibration system of the present invention is well known in the art—see for example U.S. Pat. No. 5,689,330 (Gerard, et al.), entitled "Laser Plane Generator Having Self-Calibrating Levelling System"; and U.S. Pat. No. 6,314,650 (Falb), entitled "Laser System for Generating a Reference Plane".

The robotic work object cell calibration system of the present invention is used to calibrate a "known" work object or frame (robotic simulation CAD software provided work object). The robotic work object cell calibration system of the present invention works by projecting laser beams to a known X, Y, and Z position and defining known geometric planes used to adjust the yaw, pitch, and roll of the robot tool [80] relative to the tool contact point (TCP) [60].

The laser will be projected onto the robotic end of the robot arm tooling (weld guns, material handlers, mig torches, etc) where the user will manipulate the robot with end of arc tooling into these lasers to obtain the positional difference between the "known" off-line program (simulation provided work object) and the actual (shop floor) work object calibration. The reverse is also true—for instance; a material handler robot can carry the work object [10] to a know work piece with known features.

The robotic work object cell calibration system of the present invention is used as hereafter described. The CAD model of the work object [10] is placed in the robotic simulation CAD world. The CAD user will select a position best suited on a tool or work piece to avoid crashes with other tooling and for ease of access for the Robot or end-of-arm tooling. The off-line programs are then downloaded relative to this work object [10]. The work object [10] will be placed onto the tool or work piece in the position that was defined by the CAD user onto the shop floor. The robot technician will then manipulate the robot's tool center-point into the device and align it to the laser beams to obtain the difference between the CAD world and shop floor. This difference will be entered into the robot and used to define the new work object thus calibrating the off-line programs and defining the distance and orientation of the tool, fixture, peripheral, and other key components.

The robotic work object cell calibration system of the present invention calibrates the paths to the robot (accurate or inaccurate) while involving the calibration of the peripherals of the robot.

The robotic work object cell calibration system of the present invention aids in the kiting or reverse engineering of robotic systems for future use in conjunction with robotic simulation software allowing integrators the ability to update their simulation CAD files to the "real world" positions.

The technology uses existing body-in-white procedures, personnel computers and software and ways of communicating information amongst the trades.

Throughout this application, various Patents and Applications are referenced by number and inventor. The disclosures of these documents in their entireties are hereby incorporated by reference into this specification in order to more fully describe the state of the art to which this invention pertains.

It is evident that many alternatives, modifications, and variations of the robotic work object and cell calibration system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST 10. work object (1$^{st}$ preferred embodiment)
22. horizontal frame member
24. vertical frame member
25 E-shaped structure
26A and 26B. arms
32A. left frame end (horizontal)
32B. right frame end (horizontal)
32C. upper frame end (vertical)
32D. lower frame end (vertical)
40. NAMM's mounting
41. plane-emitting laser from left-side of horizontal frame
42. plane-emitting laser from right-side of horizontal frame
43. plane-emitting laser from upper vertical frame
44. plane-emitting laser from lower vertical frame
51. projected laser plane from plane-emitting laser (41)
52. projected laser plane from plane-emitting laser (42)
53. projected laser plane from plane-emitting laser (43)
54. projected laser plane from plane-emitting laser (44)
56. laser beam from arm (26A)
58. laser beam from center of "E"
60. tool contact point
80. robot tool
82. robot joint
85A. & 85B. robot linkages
87. robot base
90. fixture
110. work object—2$^{nd}$ preferred embodiment
210. work object—3$^{rd}$ preferred embodiment
310. work object—4$^{th}$ preferred embodiment

I claim:

1. A system for calibrating a robot work path of a robot tool on an automotive shop floor using CAD simulation software, said robot work path calibrating system comprising:
   a calibration device being mountable onto a fixture, said calibration device having a frame, said frame including at least a first and second laser, said first laser emitting a first laser beam and said second laser emitting a second laser beam, said first laser beam intersecting said second laser beam at a laser intersection point; and
   a robot tool that is alienable with said calibration device at said laser intersection point;
   whereby calibration of said robot work path for said robot tool relative to said laser intersection point is enabled when said calibration device is mounted onto said fixture;
   whereby said calibration device increases accuracy of an offline program by placing said calibrating device onto said robot tool in a position defined by said CAD simulation software on said automotive shop floor after said offline program is downloaded; and
   whereby said frame includes frame ends, said frame ends being pivotally adjustable.

2. A device for calibrating a work path of a robot tool on automotive shop floor using CAD simulation software, said calibrating device including a first and second laser emitting a first and second laser beam, said first laser beam intersecting said second laser beam at a known point in space relative to said calibrating device on said automotive shop floor,
   whereby said calibrating device enables alignment of a first angular position of said robot tool relative to said known point in space;
   whereby said calibration device increases accuracy of an offline program by placing said calibrating device onto said robot tool in a position defined by said CAD simulation software on said automotive shop floor after said offline program is downloaded; and
   whereby said calibration device emits at least first and second laser planes.

3. A device to calibrate a work path of a robot tool on an automotive shop floor using CAD simulation software, said calibrating device including a first and second laser emitting a first and second laser beams, said first laser beam intersecting said second laser beam at a laser intersection point;
   whereby said calibrating device enables manipulation of said robot tool on said automotive shop floor into alignment with said laser intersection point;
   whereby said calibration device increases accuracy of an offline program by placing said calibrating device onto said robot tool in a position defined by said CAD simulation software on said automotive shop floor after said offline program is downloaded; and
   whereby said calibration device emits at least first and second laser planes.

4. A device for calibrating a work path of a robot tool on an automotive shop floor using CAD simulation software, said calibrating device including a first and second laser emitting a first and second laser beam, said first laser beam intersecting said second laser beam at a laser intersection point;
   whereby said calibrating device enables alignment of a first angular position of said robot tool relative to said laser intersection point; and
   whereby said calibration device enables manipulation of said robot tool on said automotive shop floor into alignment with said laser intersection point;
   whereby said calibration device increases accuracy of an offline program by placing said calibrating device onto said robot tool in a position defined by said CAD simulation software on said automotive shop floor after said offline program is downloaded; and whereby said calibration device emits at least first and second laser planes.

* * * * *